United States Patent Office 2,972,027
Patented Feb. 14, 1961

2,972,027
INERTIA SWITCH

Edmond Henry-Biabaud, Paris, France, assignor to Société Anonyme Andre Citroen, Paris, France, a company of France Filed Apr. 15, 1959, Ser. No. 806,707

Claims priority, application France Apr. 17, 1958

4 Claims. (Cl. 200—61.46)

This invention relates to inertia switches of the type adapted to actuate electric contacts connected in a control circuit, in response to a predetermined high rate of deceleration or acceleration of a rotating part. The invention is more especially, though not exclusively, directed, to inertia switches as used in connection with the wheels of motor-vehicles to sense an excessive rate of deceleration of the wheel, consequent on over-braking and acting to relieve the brake pressure.

In view of the high speed of modern motor vehicles and the stringent requirements of driving safety highpowered braking system have to be provided on presentday cars. While a powerful braking mechanism is an imperative requisite it brings with it the attendant danger that excessively sudden application of strong brakes, especially on a wet and slippery road surface, will result in skidding of the vehicle, thereby both reducing the effectiveness of the brakes in bringing the vehicle to a prompt stop, and introducing a grave hazard in imparting uncontrollable swerving motions to the vehicle.

To overcome this situation and prevent a positive blocking of the wheels by violent over-braking while still permitting a maximum application of the brakes consistent with safety, it has been proposed to provide inertia switch means associated with a wheel of the vehicle and responsive to the rate of deceleration thereof consequent on braking, to actuate an electric control circuit acting to cut off the braking pressure on the rate of deceleration exceeding a prescribed safety limit indicative of wheel blocking. On the wheel block being removed as a consequence of the operation of the inertia device, the reaction force from road surface re-accelerates the wheel and braking pressure is re-applied.

Conventional inertia switches of this character have generally comprised a pair of contacts respectively provided on a part rotated with vehicle wheel and on a deceleration-responsive flywheel, which contacts are adapted to be closed to complete a brake-disengaging circuit on relative rotation between the flywheel consequent on excessive deceleration of the wheel. The flywheel is normally restrained against such relative rotation by a suitably calibrated spring.

It has been found that in such inertia switches there is a strong tendency for the contacts to rebound thereby producing an objectionable unstability in the operation of the brake control circuit. It is a primary object of this invention to provide an improved inertia switch wherein such rebound of the contacts will be prevented. This object is broadly achieved in accordance with the invention by providing a friction drive for the flywheel whereby its rotation relative to the wheel is damped.

Another object is to provide an improved inertia switch which will be inexpensive to construct, compact, effective, and easy to mount and dismount on and from a vehicle wheel. Further features relate to the electrical connecting means in such an inertia switch, whereby the slip-rings and collectors generally required are eliminated. This is generally achieved by providing a central contact stud on a casing of the inertia switch assembly, adapted to be frictionally engaged by a conductive arm or plate carried by the flywheel.

The above and further objects and advantages of the invention will appear as the disclosure proceeds with reference to the accompanying drawings which illustrate one embodiment of an improved inertia switch according to the invention.

Figure 1:
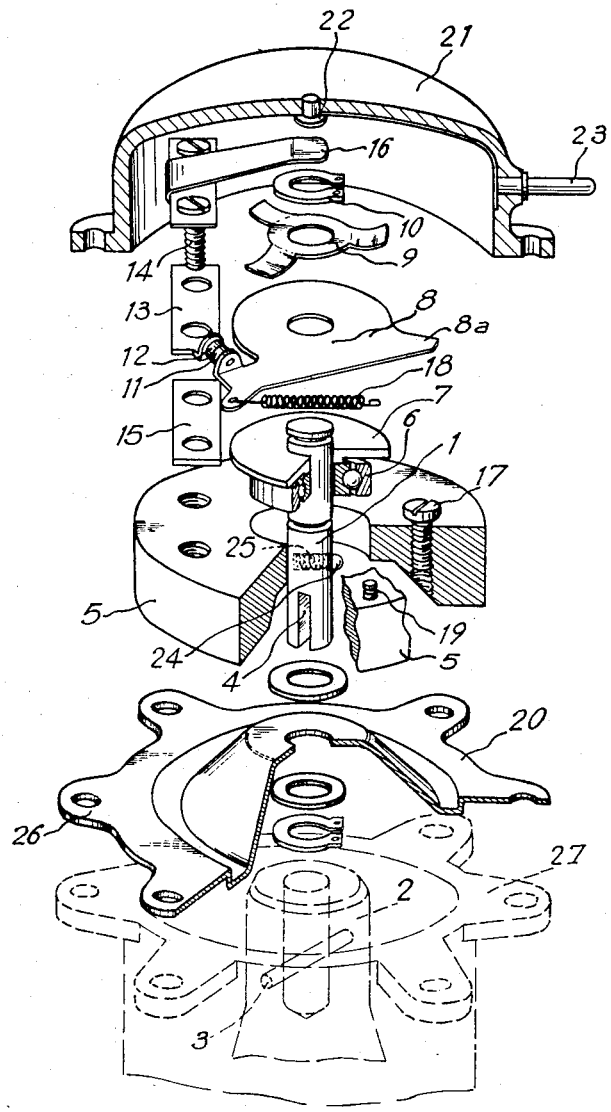
Fig. 1 is an exploded perspective view of the inertia switch.
Figure 2:
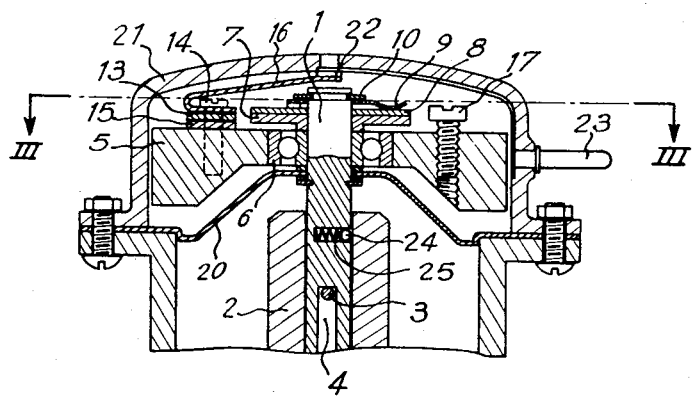
Fig. 2 is an axial section.

As shown, the improved inertia switch comprises a shaft 1 adapted to be received within a recess in the wheel axle journal 2 and blocked against rotation therein by means of a cotter pin 3 inserted through a slot 4 formed in the shaft. Rotatably journalled on the shaft 1 by way of a ball bearing 6 is a flywheel 5. Secured to the inner ball race of bearing 6 beyond the flywheel is a disc 7 over which a metallic washer 8 is retained in frictional engagement by means of a spring washer 9 and a circlip retained 10. Owing to this frictional engagement of the washer 8 the washer is normally rotated with the shaft 1.

Figure 3:
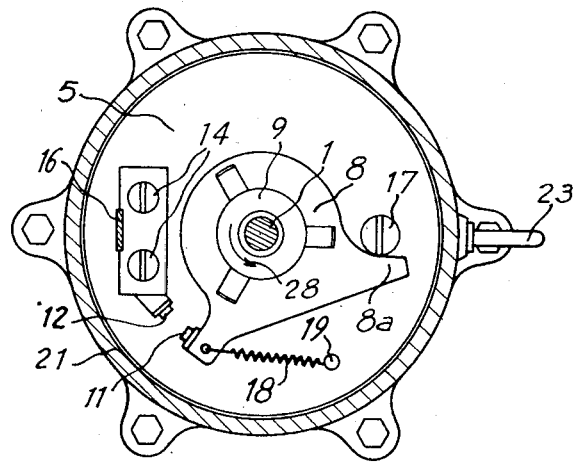
Fig. 3 is a cross section in line III—III of Fig. 2.

Secured to an appendage projecting from the washer 8 as shown in Fig. 3 is a contact 11 which is adapted to engage a contact 12 carried by a strip 13 secured by way of insulating screws 14 to the flywheel 5, an insulating strip 15 being inserted between the strip 13 and the surface of the flywheel. The metal strip 13 carries a contact plate 16 which is retained in position by the abovementioned screws 14. The washer 8 has a further projecting appendage or nose 8a adapted to engage a stop 17 such as a screw secured to the flywheel, in such a position that on engagement between the stops 8a and 17 the contacts 11 and 12 are spaced apart from each other. A spring 18 having one end secured to washer 8 and its other end secured to an anchor post 19 on the flywheel seeks to rotate the flywheel 5 with respect to the washer 8 in a direction to apply the nose 8a against the stop 17.

The assembly thus described is enclosed within a housing including a baseplate 20 and a cover 21 of insulating material. Centrally of the cover 21 is a contact stud 22 which is engaged by the aforementioned contact plate 16 and which is electrically connected with a terminal 23 projecting from a side of the cover. Furthermore, the shaft 1 is electrically connected with the wheel journal 2 by way of a metal ball 24 received in a radial socket formed in the shaft 1 and pressed outwardly therefrom by a spring 25 in the socket against the inner wall surface of the recess in the wheel journal. Casing baseplate 20 is formed with radial lugs 26 for attachment of the inertia switch assembly to the corresponding lugs of the outer race 27 of the wheel ball-bearing.

In operation, shaft 1 is rotated with the vehicle wheel in the direction indicated by arrow 28 in Fig. 3. Rotation of shaft 1 frictionally drives the washer 8 and this in turn rotates the flywheel 5 by way of the abutting surfaces of stops 8a—17. At this time the contacts 11 and 12 are separated as indicated above.

On application of the brakes and deceleration of the wheel and consequently shaft 1, should the rate of deceleration exceed a prescribed value, inertia of the flywheel 5 results in a relative rotation of the flywheel relative to the shaft 1 in the same direction as that indicated by arrow 28. This causes contact 12 to engage contact 11 thereby completing a suitable electric circuit controlling a valve, not shown, for disabling the brake applying means. A general system of this character is disclosed e.g. in co-pending patent application for "Improvements in Vehicle Braking Systems."

On relative rotation of the flywheel with respect to the shaft 1, the torque required to overcome the friction drive described is greater than the restoring torque exerted by spring 18, but friction limits the strength of impact of contact 12 against contact 11, so that rebound of the contacts is prevented.

It will be understood that various modifications may be made in the constructional details shown and described without exceeding the scope of the invention.

What I claim is:

1. An inertia switch of the type described for an automotive vehicle wheel axle, and comprising a shaft, means for connecting the shaft for rotation with said wheel axle, a flywheel rotatably journalled on said shaft, a friction disk secured to said shaft, a friction drive element engaging said friction disk so as to be normally driven by the latter for rotation with said shaft, cooperating drive surfaces on said drive element and said flywheel, spring means normally urging said drive surfaces into engagement to drive the flywheel from said drive element, and electrical contacts respectively mounted on said drive element and said flywheel and spaced from each other when said drive surfaces are in engagement, said contacts being mutually engaged when said drive surfaces are disengaged due to relative rotation of said flywheel and drive element in opposition to said spring means upon deceleration of said wheel due to over-braking, and the impact of said contacts during engagement thereof being limited by slipping of said friction drive element relative to said friction disk.

2. An inertia switch according to claim 1, including an electric contact plate carrying one of said contacts, insulating means supporting said contact plate on said flywheel and a contact stud supported in axial alignment with said wheel axle and frictionally engaged by said contact plate.

3. An inertia switch responsive to a predetermined rate of deceleration of a revolving element, comprising a part mounted on the revolving element, friction drive means tending to rotate said part with the revolving element, a flywheel mounted for rotation with respect to said part, cooperating drive means on said part and flywheel, respectively, spring means urging said flywheel relative to said part in the direction engaging said cooperating drive means, whereby said flywheel is normally driven from said part, and a pair of switch contacts on said part and flywheel, respectively, said switch contacts being spaced apart when said cooperating drive means are engaged to drive the flywheel from said part, and said switch contacts being mutually engaged upon rotation of said flywheel relative to said part in opposition to said spring means as a result of deceleration of the revolving element at a rate exceeding said predetermined rate, said friction drive means being effective to damp said relative rotation and thereby minimize rebound between said switch contacts.

4. An inertia switch of the described type for an automotive wheel axle, said switch comprising a shaft, means for connecting said shaft for rotation with the wheel axle, a flywheel rotatably mounted on said shaft, a friction disk secured to said shaft, a friction drive element engaging said friction disk so as to be normally driven by the latter for rotation with said shaft, said friction drive element having a projection extending therefrom, a stop on said flywheel located so as to extend into the path of rotation of said projection with said friction drive element, spring means connected between said flywheel and said friction drive element to urge said stop into engagement with said projection so that said flywheel is normally rotationally driven from said friction drive element, a first switch contact on said friction drive element, a second switch contact, and means mounting said second contact on said flywheel at a location where said second contact is spaced from said first contact when said stop engages said projection, whereby said second contact engages said first contact in response to rotation of said flywheel relative to said friction drive element in opposition to said spring means, and said friction drive element can slip relative to said friction disk in response to the impact of said second contact against said first contact, thereby to minimize rebound of said contacts.

References Cited in the file of this patent

UNITED STATES PATENTS

| | | |
|---|---|---|
| 2,687,047 | O'Connor | Aug. 24, 1954 |
| 2,772,904 | Doolittle | Dec. 4, 1956 |
| 2,818,244 | Ropar | Dec. 31, 1957 |